US011988447B2

(12) United States Patent
Åhsberg

(10) Patent No.: US 11,988,447 B2
(45) Date of Patent: May 21, 2024

(54) APPARATUS FOR DRYING A WATER DAMAGED FLOOR STRUCTURE

(71) Applicant: Reddo Floor Solutions AB, Stockholm (SE)

(72) Inventor: Johan Åhsberg, Mollösund (SE)

(73) Assignee: Reddo Floor Solutions AB, Stockholm (SE)

( * ) Notice: Subject to any disclaimer, the term of this patent is extended or adjusted under 35 U.S.C. 154(b) by 344 days.

(21) Appl. No.: 17/617,354

(22) PCT Filed: Jun. 8, 2020

(86) PCT No.: PCT/SE2020/050573
§ 371 (c)(1),
(2) Date: Dec. 8, 2021

(87) PCT Pub. No.: WO2020/251451
PCT Pub. Date: Dec. 17, 2020

(65) Prior Publication Data

US 2022/0228806 A1 Jul. 21, 2022

(30) Foreign Application Priority Data

Jun. 10, 2019 (SE) .................................... 1950687-2

(51) Int. Cl.
*F26B 21/00* (2006.01)
*E04B 1/70* (2006.01)
*F26B 7/00* (2006.01)

(52) U.S. Cl.
CPC .......... *F26B 21/001* (2013.01); *E04B 1/7092* (2013.01); *F26B 7/005* (2013.01)

(58) Field of Classification Search
CPC ... F26B 21/001; F26B 21/7005; E04B 1/7092
(Continued)

(56) References Cited

U.S. PATENT DOCUMENTS 5,960,556 A * 10/1999 Jansen .................. E04B 1/7092 34/443
6,210,132 B1 * 4/2001 Shiinoki ................ F04C 23/00 417/372
(Continued)

FOREIGN PATENT DOCUMENTS

CA 3142872 A1 * 12/2020 ........... E04B 1/7092
DE 3815161 A1 11/1989
(Continued)

OTHER PUBLICATIONS

International Search Report dated Jul. 9, 2020 in corresponding International Application No. PCT/SE2020/050573.
(Continued)

*Primary Examiner* — Stephen M Gravini
(74) *Attorney, Agent, or Firm* — Renner, Otto, Boisselle & Sklar, LLP

(57) ABSTRACT

A drying apparatus for a water damaged floor structure having an intermediate layer between a surface layer and a subfloor, which drying device comprises a suction blower for, from an outlet opening in the floor structure, drawing humidified process air from the intermediate layer and heating the humidified air, and a sorption dehumidifier to receive the heated process air from the suction blower, convert it to heated dry air and, through an inlet opening in the floor structure, separate from the outlet port, force the heated dry air to the intermediate layer, where the heated dry air accumulates moisture from the floor structure and is converted to new process air which is again sucked up and heated by the suction blower in a closed process. According to the invention, the dryer has a PTC element for a sorbent block in the dehumidifier, a common housing for the suction fan and dehumidifiers, and a sound and heat insulation in the housing.

3 Claims, 4 Drawing Sheets

(58) Field of Classification Search
USPC .............................................................. 34/80
See application file for complete search history.

(56) References Cited

U.S. PATENT DOCUMENTS

| | | | | |
|---|---|---|---|---|
| 2005/0120715 | A1* | 6/2005 | Labrador .................. | F03G 7/00 60/618 |
| 2005/0257394 | A1* | 11/2005 | Claesson ................... | F26B 5/12 34/92 |
| 2017/0227241 | A1 | 8/2017 | Claesson et al. | |
| 2022/0228806 | A1* | 7/2022 | Åhsberg ................ | E04B 1/7092 |
| 2023/0152287 | A1* | 5/2023 | Wang ...................... | G01N 33/00 73/23.34 |

FOREIGN PATENT DOCUMENTS

| | | | | | |
|---|---|---|---|---|---|
| EP | 0801720 | A1 | | 10/1997 | |
| EP | 1923642 | A1 | | 5/2008 | |
| JP | H0199630 | A | | 4/1989 | |
| NO | 319975 | B1 | * | 10/2005 | ........... E04B 1/7092 |
| SE | 1630308 | A1 | | 6/2018 | |
| SE | 1630296 | A1 | | 7/2018 | |
| SE | 543370 | C2 | * | 12/2020 | ........... E04B 1/7092 |
| WO | WO-03016647 | A1 | * | 2/2003 | ........... E04B 1/7092 |
| WO | WO-2020251451 | A1 | * | 12/2020 | ........... E04B 1/7092 |

OTHER PUBLICATIONS

Written Opinion dated Jul. 9, 2020 in corresponding International Application No. PCT/SE2020/050573.

* cited by examiner

APPARATUS FOR DRYING A WATER DAMAGED FLOOR STRUCTURE

This application is a national phase of International Application No. PCT/SE2020/050573 filed Jun. 8, 2020, which claims priority to Swedish Application No. 1950687-2 filed Jun. 10, 2019, the entire disclosures of which are hereby incorporated by reference.

TECHNICAL AREA this invention relates to an apparatus for drying a water damaged floor structure having an intermediate layer between a surface layer and a subfloor, the drying apparatus comprising a suction blower for drawing, from an outlet opening in the floor structure, moist process air from the intermediate layer and heating the moist air, a sorption dehumidifier having a fan and a sorption block of a rotating type and arranged to divide the process air into a dry air flow and a wet air flow, the sorption dehumidifier fan having an inlet for process air from the environment and being arranged between the suction blower and the sorption block, a PTC element arranged in a regeneration chamber in the sorption dehumidifier for the sorption block in the sorption dehumidifier, and a common housing for the suction blower and the sorption dehumidifier.

BACKGROUND

An arrangement for drying such a floor structure is known from SE 1630308 A and shows the suction blower and dehumidifier connected in series with a pipeline. The blower, which can be a side channel blower, needs to have high suction capacity to create the vacuum which can draw the moisture-laden air from the intermediate layer which forms narrow passages on both sides of a damp proofing layer. The blower thus generates noise and high sound levels which can make it difficult for persons to stay for example in a dwelling for the time required to dry the floor structure. The fan also emits thermal energy that is lost to the surroundings. In addition, at each drying occasion, the different parts of the arrangement need to be handled, transported, mounted and dismantled. Therefore, there is a desire to develop an improved drying device of the specified kind.

DISCLOSURE OF THE INVENTION

It is therefore an object of the invention to provide a drying device which obviates the problems of the known arrangement.

According to the invention, the sorption dehumidifier is arranged to receive the heated moisture-laden process air from the suction fan mixed with the process air from the environment and divide the thus mixed process air into the dry air flow and the wet air flow, and the dry air flow is arranged to be pushed down to the intermediate layer through an inlet opening separate from the outlet opening in the floor structure where it accumulates moisture from the floor structure and is converted to new process air which is again drawn and heated by the suction fan and the heat in a closed process, and there is a sound and heat insulation in the housing.

In this way, an optimally integrated drying machine which is easy to handle, transport and install, as well as has low noise and is energy efficient, can be provided in a surprisingly simple manner.

The presence of the PTC element enables continuous dehumidification at high temperatures without activating an over-heat protection device, which is not the case with traditional pipe dehumidifiers. As a result, the drying device also becomes more or less self-regulating, so that it can work safer without supervision. Thus, the PTC element is crucial for the operation of the apparatus.

The energy efficiency is achieved by the fact that a large part of the heat which is otherwise emitted to the environment from the suction fan including its motor and suction and pressure lines can be suitably delivered to the dehumidifier inside the heat insulated housing where it is reused by the dehumidifier. The suction blower provides the greater part of the process air flow through the intermediate layer and therefore needs high power which generates high heat. This is advantageous and of great importance for this type of drying operation, where the dry air emitted from the dehumidifier needs to be as hot as possible for best drying results.

The sound and heat insulation may be a laminate comprising a thicker insulating and damping layer and a thinner reflective layer. Thereby the dryer can easily be heat and sound insulated.

In one embodiment, the suction blower may be located at the underside of the dehumidifier in the housing. Then the dehumidifier can be heated by convection from rising air heated by the suction fan in the housing.

Other features and advantages of the invention may be apparent from the claims and the following detailed description.

BRIEF DESCRIPTION OF THE DRAWING

In the drawings, wherever possible, same reference numerals are throughout used for components with the same or similar function.

DETAILED DESCRIPTION OF EMBODIMENTS

Figure 1:
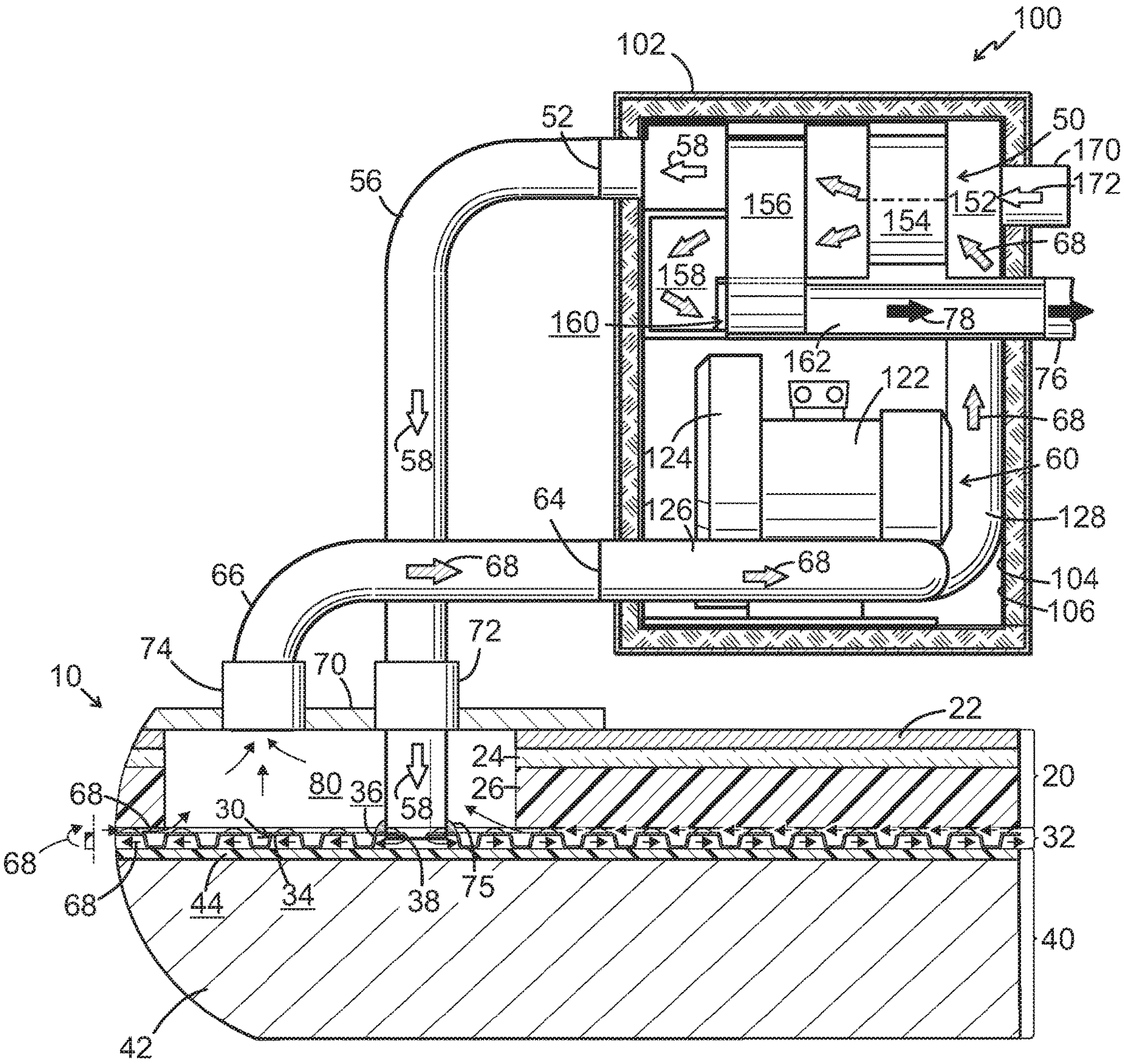
FIG. 1 is a simplified side view, partly in section and with parts broken away, showing a drying apparatus according to the invention during a drying operation of a floor structure.

In the embodiment shown in FIG. 1, the drying apparatus 100 according to the invention is intended to dry a water damaged floor structure 10 of the type having a damp proofing layer 30 in an intermediate layer 32 having an air gap between a flooring 20 and a subfloor 40.

Typically, in such a floor structure 10, the flooring 20 may consist of a surface layer 22, a chipboard layer 24 and a heat-insulating layer 26 of cellular plastic, while the subfloor 40 may consist of a base/baseplate 42 of concrete and a soundproofing cellular plastic layer 44. The damp proofing layer 30 may be a membrane known under the trademark Platon® which is formed with a pattern of projections projecting at least from a bottom side 34 of the membrane to define the air gap 32 between the subfloor 40 and the flooring 20.

In the flooring 20, e.g. with a cutter not shown, a space 80 is opened-up down to the damp proofing layer 30. The space 80 provides access to the damp proofing layer 30 to form a dry air inlet 38 therewith. The dry air inlet 38 can be made with any suitable means, e.g. manually with a knife (not shown), which cuts an opening in the layer, after which the material thus cut away is removed.

At the top of the flooring 20, the space 80 is sealed closed by a plate 70 during the drying operation described below. The plate 70 may have a pair of through-tubes 72 and 74 for sealingly receiving a respective dry air conduit 56 and a process air conduit 66, in turn, extending to a respective dry air outlet 52 and a process air inlet 64 of the drying apparatus 100. The dry air conduit 56 extends through the space 80 and into the dry air inlet 38 where it is sealed by a suitable sealing agent, such as bitumen. The process air conduit 66, in turn, extends only into the space 80 which can be regarded as an outlet orifice chamber for humid process air. The plate 70 may be attached and sealed to the flooring 20 by suitable means not shown, e.g. glue or screws and sealing strips.

The drying operation is carried out such that the drying device 100 creates a strong underpressure and draws process air 68 from the process air line 66 while pressing heated dry air 58 into the dry air line 56. The heated dry air 58 is spread in all directions while accumulating moisture from the subfloor 40. When the process air 68 reaches the end edges of the layer 30, it is forced by the strong underpressure to change direction and flow radially toward the space 80 and accumulate more moisture in the portion of the gap 32 at the the top of layer 30. The process air 68 then enters the space 80, from which it is sucked into the process air line 66 and further to the drying apparatus 100.

The drying apparatus 100 has a housing 102 with an internal sound and heat insulation. The sound and heat insulation comprises a laminate having a thicker sound attenuating and heat insulating layer 104 and a thinner sound and heat reflecting layer or film 106. The laminate may be adhered to the interior of the housing 102.

Within the sound and heat insulation 104, 106, in the housing 102, a dehumidifier 50 is mounted parallel to a suction blower 60. Thereby the dehumidifier can be heated by rising heated air from the suction fan 60 inside the housing 102.

Figure 2:
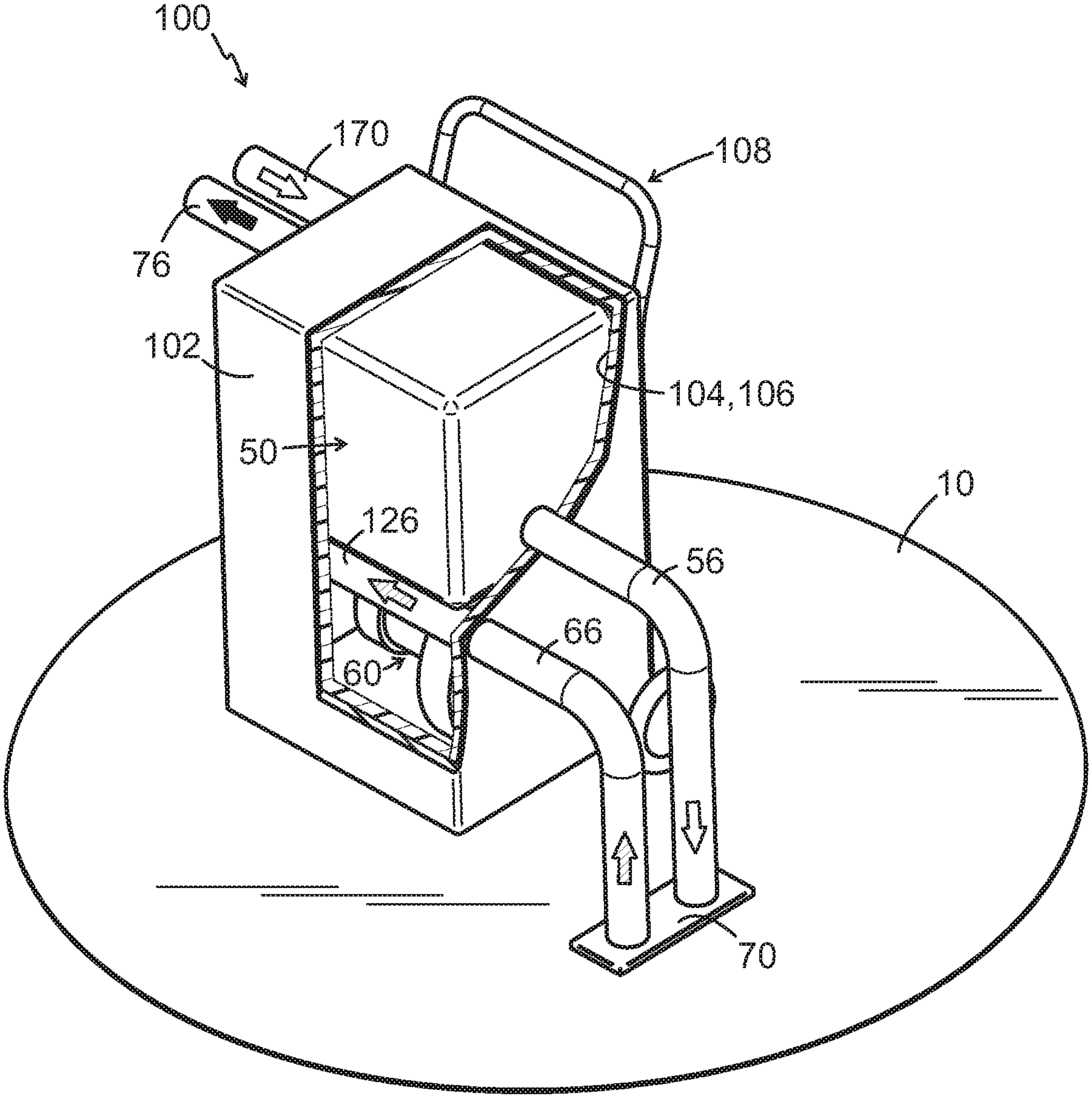
FIG. 2 is a simplified perspective view with broken away parts of a dryer according to the invention during a drying operation of a floor structure according to FIG. 1.

In FIG. 2, there is also shown a slightly modified dryer device 100 mounted on a hand trolley 108 to be easily moved over shorter distances.

As can be seen most clearly in FIG. 1, the suction blower 60 is a side channel blower including an electric motor 122 and a centrifugal blower housing 124, which has a suction duct 126 arranged to be connected to the above-mentioned process air line 66, and an outlet duct 128 connected to an inlet 152 of the dehumidifier 50.

Dehumidifier 50 is a sorption dehumidifier having an inlet 170 for process air 172 from the environment. At the inlet 170 there is a fan or blower, such as a duct fan 154, to increase the flow rate of the process air flow 172 from the environment mixed with the process air flow 68 heated by the suction blower further into the dehumidifier 50. After the fan 154, the process air is conducted into a sorption block 156 which can be of a rotating type. The sorption block 156 has an absorbent for accumulating moisture in the process air and is capable of dividing the outgoing flow into the above-mentioned dry-air flow 58 and a wet-air flow 78 which is discharged from the drying apparatus 100 through an outlet duct 162, from which it can be discharged through a wet-air conduit 76. Dehumidifier 50 also has a regeneration chamber 158 in which there is a self-regulating so-called PTC (Positive Temperature Coefficient) element 160 to further heat the resulting dry air when needed. Without such a PTC element, dehumidification would deteriorate by activating an overheat-protective device and thereby degrading operation.

Figure 3:
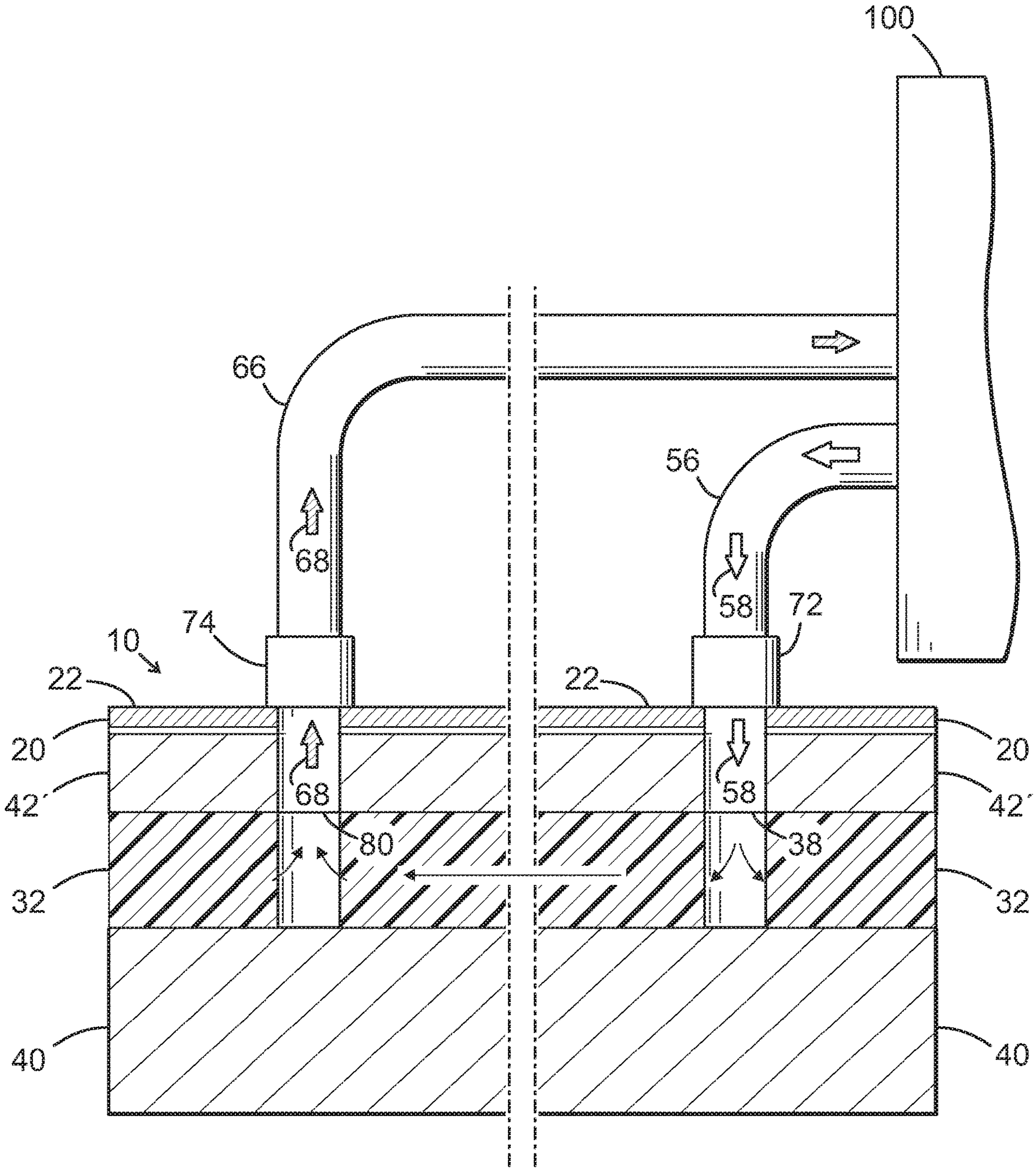
FIG. 3 is a simplified side view, partly in section and with parts broken away, showing a drying apparatus of FIG. 1 during a drying operation of another floor structure.

In the embodiment shown in FIG. 3, the drying apparatus 100 according to the invention is intended to dry a moisture-damaged floor structure 10 of the kind which, below a flooring 20 with a surface layer 22, has an intermediate layer 32 in the form of a porous heat-insulating layer between an upper concrete layer 42' and a lower concrete layer/subfloor 40 such as a frame/base plate in a building wall. In this example, therefore, there is no moisture-protecting layer or air gap as in the example already described. The air transported here and collecting moisture in the intermediate layer 32 can now flow more uniformly in the porous layer between the inlet opening 38 and the outlet opening 80, which in this case are arranged at greater distances from each other in the floor structure.

Figure 4:
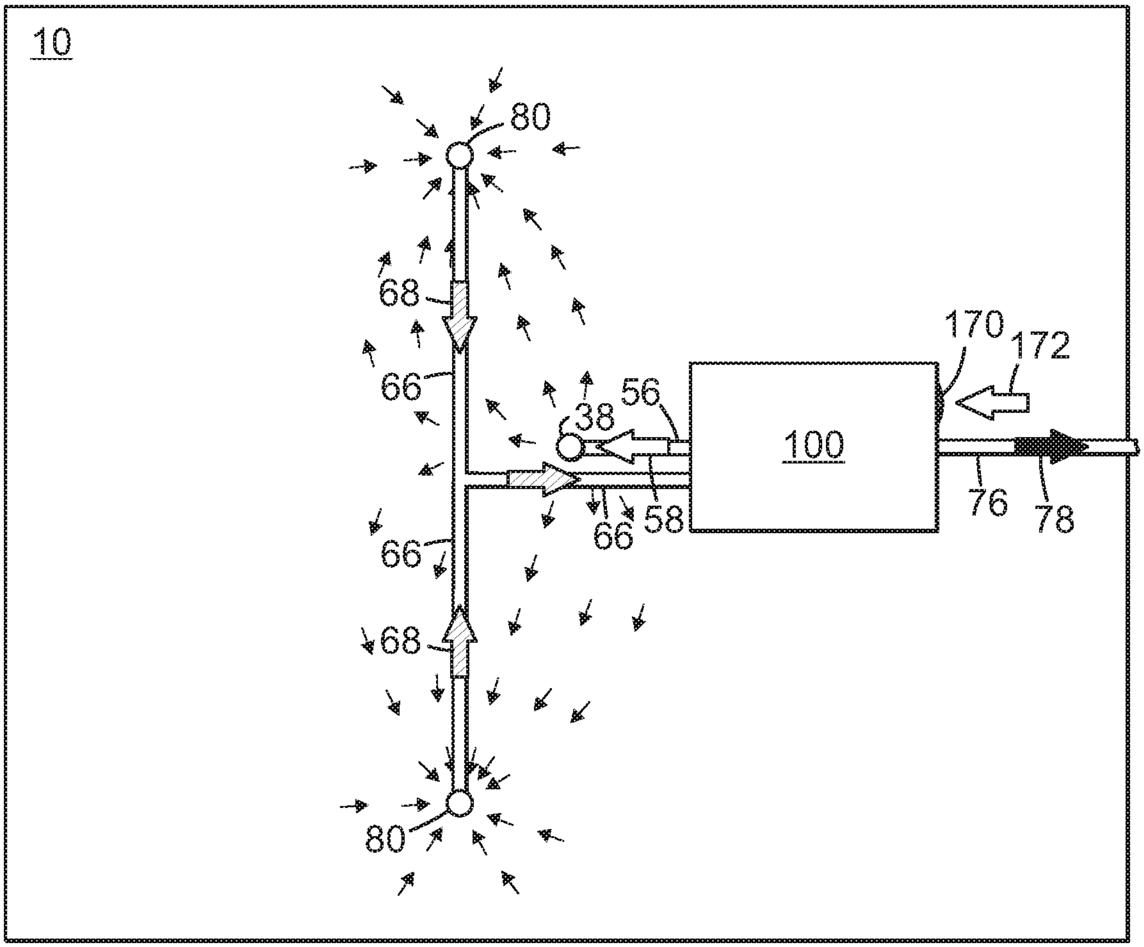
FIG. 4 is a diagrammatic plan view showing a drying apparatus of FIG. 1 during an alternative drying operation where the floor structure has two outlet openings.

FIG. 4 shows the possibility of sucking process air 68 from two outlet openings 80 in the floor structure 10 with the drying apparatus 100. In a manner not shown more than two outlet openings 80 are likewise possible. Even more than one inlet port 38 can be used.

The above detailed description is primarily intended to facilitate understanding and no unnecessary limitations of the invention are to be construed therefrom. The modifications which will become apparent to those skilled in the art upon review of the specification may be made without departing from the scope of the appended claims.

The invention claimed is:

1. A drying apparatus for a water damaged floor structure having an intermediate layer between a surface layer and a subfloor, the drying apparatus comprising
- a suction blower for drawing, from an outlet opening in the floor structure, moist process air from the intermediate layer and for heating the moist process air;
- a sorption dehumidifier having a fan and a sorption block of a rotating type and adapted to divide the process air into a dry air flow and a wet air flow;
- the fan of the sorption dehumidifier having an inlet for process air from an environment and being arranged between the suction blower and the sorption block;
- a PTC element arranged in a regeneration chamber in the sorption dehumidifier for the sorption block in the sorption dehumidifier; and
- a common housing for the suction blower and the sorption dehumidifier;

wherein
- the sorption dehumidifier is arranged to receive the heated moist process air from the suction blower mixed with the process air from the environment and divide the thus mixed process air into the dry air flow and the wet air flow;
- the dry air flow is arranged to be forced down to the intermediate layer through an inlet opening separate from the outlet opening in the floor structure where the dry air flow accumulates moisture from the floor structure and is converted into new process air which is again drawn and heated by the suction blower in a closed process; and
- a sound and heat insulation in the housing.

2. The drying apparatus according to claim 1, wherein the suction blower is located at an underside of the sorption dehumidifier in the housing parallel thereto.

3. The drying apparatus according to claim 1, wherein the sound and heat insulation comprises a laminate having a thicker damping layer and a thinner reflective layer.

* * * * *